United States Patent [19]
Najmolhoda et al.

[11] Patent Number: 5,996,628
[45] Date of Patent: Dec. 7, 1999

[54] PROPORTIONAL VARIABLE FORCE SOLENOID CONTROL VALVE

[75] Inventors: Hamid Najmolhoda, Grandville; Charles J. Mullally, Muskegon, both of Mich.

[73] Assignee: Saturn Electronics & Engineering, Inc., Auburn Hills, Mich.

[21] Appl. No.: 08/586,056

[22] Filed: Jan. 16, 1996

[51] Int. Cl.$^6$ .......................... F15B 13/043; F16K 31/08
[52] U.S. Cl. ................... 137/625.61; 29/890.13; 137/625.64; 251/65; 251/129.08; 251/129.14; 251/129.18; 335/274
[58] Field of Search .................. 29/890.13; 137/625.61, 137/625.64; 251/65, 129.08, 129.14, 129.18; 335/274

[56] References Cited

U.S. PATENT DOCUMENTS

| | | | |
|---|---|---|---|
| 2,433,703 | 12/1947 | Mekelburg | 335/274 X |
| 3,738,578 | 6/1973 | Farrell | 251/65 X |
| 3,818,927 | 6/1974 | Zeuner | 137/110 |
| 3,861,644 | 1/1975 | Knape . | |
| 4,071,042 | 1/1978 | Lombard et al. | 137/332 |
| 4,690,371 | 9/1987 | Bosley et al. | 251/129.08 X |
| 4,767,097 | 8/1988 | Everett et al. | 251/129.08 |
| 4,863,142 | 9/1989 | Hendrixon et al. | 251/129.08 |
| 4,946,009 | 8/1990 | Knutson . | |
| 4,966,195 | 10/1990 | McCabe | 137/625.61 |
| 4,988,074 | 1/1991 | Najmolhoda . | |
| 5,051,631 | 9/1991 | Anderson | 310/14 |
| 5,060,695 | 10/1991 | McCabe | 137/625.61 |
| 5,067,688 | 11/1991 | Tamimoto et al. . | |
| 5,240,227 | 8/1993 | Sich | 251/129.16 |
| 5,322,260 | 6/1994 | Forbes et al. | 251/129.18 X |
| 5,344,118 | 9/1994 | Kamiya et al. | 251/129.15 |
| 5,476,313 | 12/1995 | Lauer | 251/129.15 X |
| 5,513,832 | 5/1996 | Becker et al. | 251/129.18 |
| 5,611,370 | 3/1997 | Najmolhoda | 251/129.14 X |
| 5,636,828 | 6/1997 | Brehm et al. | 251/129.14 |
| 5,685,493 | 11/1997 | Grytz et al. | 251/129.21 X |
| 5,769,328 | 6/1998 | Zdyb et al. | 251/129.18 X |

FOREIGN PATENT DOCUMENTS

| | | |
|---|---|---|
| 0184124 | 6/1986 | European Pat. Off. . |
| 0485737 | 5/1992 | European Pat. Off. . |
| 0492109 | 7/1992 | European Pat. Off. . |
| 3432728 | 3/1986 | Germany . |
| 4206210 | 9/1993 | Germany . |
| 4228045 | 3/1994 | Germany . |
| 4424437 | 8/1995 | Germany . |
| 4423103 | 1/1996 | Germany . |
| WO93/15941 | 8/1993 | WIPO . |

*Primary Examiner*—Gerald A. Michalsky

[57] ABSTRACT

A proportional variable force solenoid valve comprises a non-magnetic housing having a solenoid and a permanent magnet armature movable by the solenoid in response to current applied to the solenoid, a coil compression spring for biasing the armature in a direction to establish a valve fluid pressure response to solenoid current, and a valve housing closure engaging the spring and permanently deformed to position the closure relative to the spring in a manner to adjust the valve response. The size of the valve is reduced by providing a permanent magnet armature of reduced length having a flat outermost axial end which is engaged by the spring. A plate spring retainer is disposed on the flat axial end of the permanent magnet armature and is received with clearance in an enlarged longitudinal bore region of the solenoid coil bobbin.

34 Claims, 3 Drawing Sheets

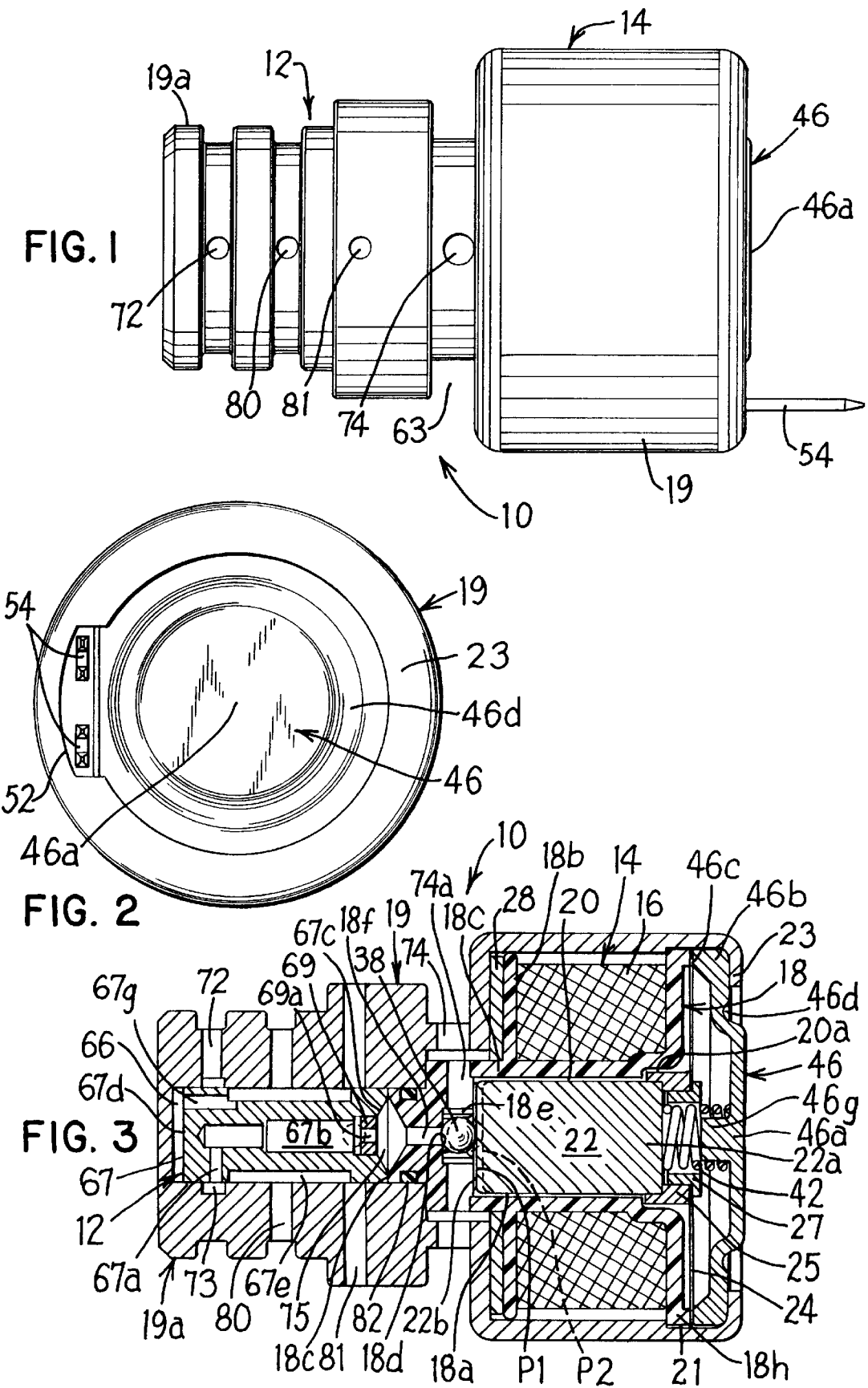

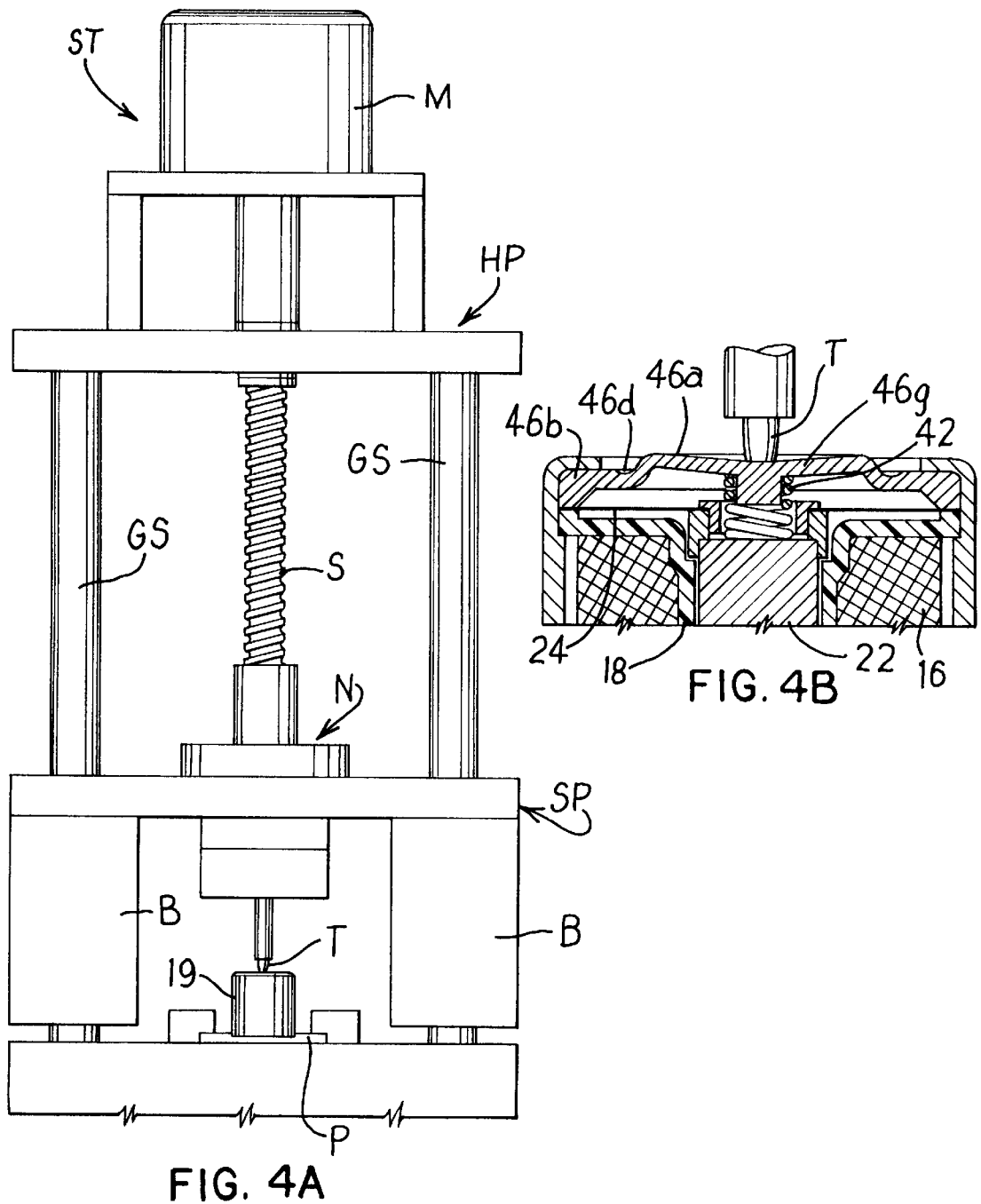

PROPORTIONAL VARIABLE FORCE SOLENOID CONTROL VALVE

FIELD OF THE INVENTION

The present invention relates to a proportional variable force solenoid operated valve that controls fluid pressure in response to electrical current applied to a valve solenoid and, more particularly, to a proportional variable force solenoid operated valve having improved valve response adjustability features and reduced size requirements.

BACKGROUND OF THE INVENTION

A proportional variable force solenoid control valve that is relative low in cost to manufacture and compact in size while maintaining substantially linear proportional fluid control is described in the Najmolhoda U.S. Pat. No. 4,988,074 issued Jan. 29, 1991, of common assignee herewith. The patented proportional variable force solenoid control valve comprises an outer steel solenoid housing and an aluminum valve member housing joined together mechanically such as by tabs on the steel solenoid housing being crimped about regions of the aluminum valve member housing.

The proportional variable force control valve includes a ferromagnetic (e.g. steel) armature suspended by low spring rate springs at opposite ends of the armature within the bore hole of a coreless solenoid bobbin for reciprocable movement between positions corresponding to a closed valve position and fully open valve position in response to applied electrical current to an electromagetic coil. The position of the armature is controlled by balancing the variable force of an electromagnetic field of an electromagnetic coil and the force of the magnetic field of a permanent ring magnet against the force of a compression coil spring which biases the valve toward the closed position of the valve. The electromagnetic coil, bobbin and armature reside in the steel solenoid housing in a manner that the steel housing provides a concentration of flux of the electromagnetic field at the armature. The fluid control valve on the end of the armature moves relative to a valve seat disposed in the aluminum valve housing to communicate a fluid inlet to fluid exhaust ports so as to regulate fluid pressure at fluid control ports in a manner proportional to the magnitude of applied electrical current.

A commercially manufactured version of the aforementioned patented proportional variable force solenoid fluid control valve has been modified to include a stainless steel ball valve and a separate stainless steel valve seat insert pressed in the nozzle. The ball valve is captured in a stainless steel cage between the valve seat and a rod-like, cylindrical shaped steel armature that moves relative to the valve seat in a manner proportional to the magnitude of electrical current applied to the electromagnetic coil. As the armature moves relative to the valve seat to actuate the valve, the ball valve is caused to follow the end of the armature by virtue of fluid pressure in the valve member housing and confinement in the ball valve cage in the bobbin. The fluid inlet is communicated to fluid exhaust ports by opening of the ball valve so as to regulate fluid pressure at fluid control ports in a manner proportional to the magnitude of electrical current applied to the coil.

A spool valve is disposed in the valve member housing for providing a two stage, high flow capability wherein pressurized fluid supplied to the inlet port initially is directed to bypass the control ports and flows to an end of the spool valve to move it from a zero fluid flow spool position to a maximum fluid flow spool position relative to the control ports as determined by the cracking pressure preset for the ball valve by adjustment of the coil spring force. Thereafter, a second stage of operation involves controlling the fluid flow through the control ports by moving the spool valve between minimum and maximum flow spool positions in a manner proportional to the magnitude of electrical current to the coil. Such proportional variable force solenoid control valves commercially manufactured to-date are operably mounted to a cast aluminum transmission body or case by a clamp plate, bolt, or both engaging an outer nozzle groove.

An object of the present invention is to provide a proportional variable force solenoid fluid control valve having improved and simplified valve response adjustability during production adjustment.

Another object of the present invention is to provide a proportional variable force solenoid control valve having improved and simplified permanent magnet armature arrangement that reduces valve size requirements.

SUMMARY OF THE INVENTION

The present invention provides a proportional variable force solenoid fluid control valve for controlling the pressure of a pressurized fluid in a fluid control system in proportion to the current level of an electrical input signal. In one embodiment of the present invention, the proportional variable force solenoid fluid control valve comprises an armature in engagement with a fluid pressure control valve and movable in response to electrical current applied to a solenoid, spring means for biasing the armature in a direction to establish a valve fluid pressure response to current level supplied to the solenoid (i.e. fluid pressure versus solenoid current), and a valve housing closure that engages the spring means and that is permanently deformed after valve assembly to position the valve housing closure relative to the spring means in a manner to adjust the valve fluid pressure response to a desired performance specification.

The housing closure typically includes a peripheral lip that is received and secured in an end chamber of the valve housing, a central hub that engages the spring means, and an annular recessed or grooved region between the hub and the peripheral lip and concentric with the lip. The housing closure is assembled to the valve housing with a closure hub engaging the spring means, and then the closure is permanently deformed by an adjustment tool engaging the central hub in a manner to permanently adjust the position of the closure hub relative to the spring means to adjust the valve response to solenoid current. The closure hub and annular recessed or grooved region typically are deformed to adjust the position of the closure hub relative to the spring means to adjust the valve response to solenoid current.

Valve response adjustment using the components and in the manner described hereabove is improved and simplified in that a costly threaded valve adjustment screw heretofore used is eliminated and in that deformation of the closure is permanent and maintains the adjusted valve response so as to improve reliability of the valve in service. The invention is useful to provide a low flow pressure regulator control device or a spool flow amplifying control device.

In another embodiment of the present invention, the proportional variable force solenoid fluid control valve comprises a permanent magnet armature arrangement that is advantageous to reduce the size requirements of the valve. For example, the armature comprises a cylindrical permanent magnet having a reduced length terminating in a flat outermost axial end that is engaged by a biasing spring that determines valve response and is encompassed by the solenoid coil when the solenoid is deenergized. A solenoid coil bobbin includes a cylindrical, longitudinal bore that receives the permanent magnet armature and a radially enlarged end flange that engages a plate spring by which the armature is positioned in the bobbin bore. The bobbin bore includes a radially enlarged bore region proximate the end flange and encompassed by the solenoid coil for receiving a plate spring retainer member disposed on the armature axial end.

The foregoing and other objects, features, and advantages of the invention will become apparent from the following more detailed description taken with the accompanying following drawings.

BRIEF DESCRIPTION OF THE DRAWINGS

FIG. 1 is a plan view of a proportional variable force solenoid fluid control valve in accordance with an embodiment of the invention.

FIG. 2 is an end elevational view of the proportional variable force solenoid fluid control valve of FIG. 1.

FIG. 3 is a longitudinal cross section view of the proportional variable force solenoid fluid control valve of FIG. 1.

FIG. 4A is an elevational view of an adjustment tool for deforming an adjustable valve housing end closure to set valve cracking pressure.

FIG. 4B is a cross section view of the end closure engaged with the adjustment tool to set valve cracking pressure.

DESCRIPTION OF THE INVENTION

Figure 5:
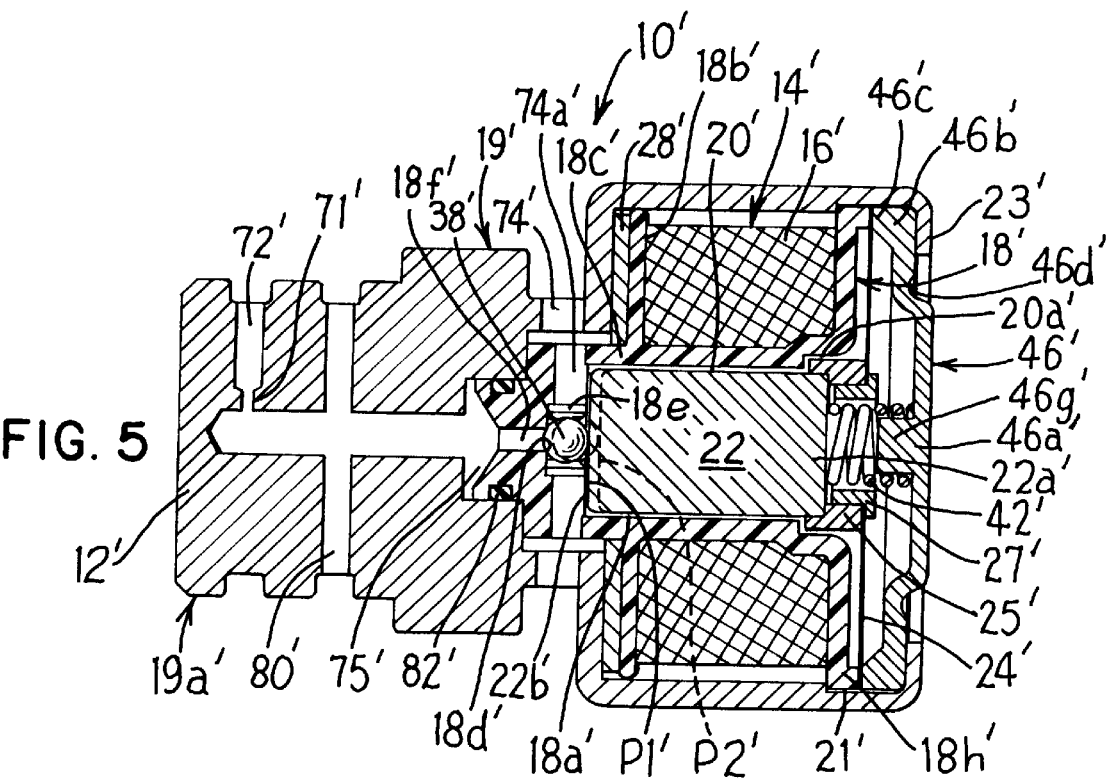
FIG. 5 is a longitudinal cross section view of a low flow pressure regulator control device sans spool in accordance with another embodiment of the invention.

Referring to FIGS. 1–3, a proportional variable force solenoid fluid control valve 10 includes valve member 12 and solenoid 14 disposed in a common valve housing 19 to provide a compact fluid control unit as described in copending application Ser. No. 08/337 613, now U.S. Pat. No. 5,611,570, of common assignee herewith, the teachings of which are incorporated herein by reference. The housing 19 preferably comprises a substantially non-magnetic housing material having little or no magnetic permeability, for example, as compared to the magnetic permeability of a ferromagnetic material, such as steel. A material particularly suited for the housing 19 comprises aluminum and its alloys or thermoplastic formed by casting or injection molding to required housing configuration to receive the valve member 12 and the solenoid 14.

An aluminum housing 19 offers benefits of low cost material and ready manufacture. Although aluminum and its alloys are particularly preferred for fabrication of the housing, the invention is not so limited and can be practiced using other housing materials that include, but are not limited to, magnesium based alloys, austenitic stainless steel, plastics, and other substantially non-magnetic materials having little or no magnetic permeability as compared to that of steel. The invention may be practiced using a ferromagnetic material, such as steel, for the common housing material, although this is less preferred.

The solenoid 14 includes an electromagnetic coil 16 wound about a molded plastic bobbin 18 which has a cylindrically shaped bore hole 20 through the longitudinal axis thereof. The bobbin 18 is made of glass filled thermoplastic. A rod-like, solid permanent magnet armature 22 is suspended within the bore hole 20 of the plastic bobbin 18 by a thin low spring rate spring 24 mounted at a rear, outermost end 22a of the armature. The armature 22 comprises a cylindrical shaped rare earth permanent magnet (or other suitable permanent magnet material) having improved magnetic characteristics, such as energy product and magnetic stability at elevated temperatures.

The plate spring 24 is of the type described in U.S. Pat. No. 4,988,074, the teachings of which are incorporated herein by reference. That is, the spring plate is formed from very thin non-magnetic austenitic stainless steel, such as full hard austenitic stainless steel, which provides a very low rate spring for the spring configuration shown in FIG. 5 of the aforementioned '074 patent. The inner periphery of the plate spring 24 is mounted by half hard brass plate retainer member 25 and half hard brass magnet retainer 27 to the rear, outermost end 22a of the armature 22 so as to suspend the armature 22 for free axial longitudinal movement within the bobbin 18 while leaving the opposite front, innermost end 22b of the armature unsupported by a spring plate. The outer periphery of the plate spring 24 is mounted between the radially enlarged end flange 18h of the coil bobbin 18 and a valve housing cap or closure 46 made of aluminum alloy (e.g. Al alloy 6061 T6).

In accordance with one embodiment of the invention that is advantageous to reduce the size, in particular the length, of the fluid control valve 10, the permanent magnet armature 22 comprises a cylindrical permanent magnet having a reduced length terminating in the flat outermost axial end 22a that is disposed within or encompassed by the solenoid coil 16 when no electrical current is supplied to the solenoid coil 16 such that coil spring 42 positions the armature 22. The length of the permanent magnet armature 22 (e.g. 0.510 inch) is substantially shorter as compared to the length (e.g. 0.635 inch) of permanent magnet armatures used heretofore. To accommodate the shorter permanent magnet armature 22, the solenoid bobbin bore hole 20 is provided with a radially enlarged bore region 20a proximate the end flange 18h for receiving the outermost armature end 22a within the solenoid coil 16 when the solenoid coil 16 is deenergized. For example, the enlarged bore region 20a is sized radially and axially to receive with clearance the plate spring retainer member 25 disposed on the armature end 22a so as to permit unhindered movement of the armature 22 in the bore hole 20. A typical inner diameter of the enlarged bore region 20a is 0.350 inch as compared to the diameter (e.g. 0.300 inch) of the remainder of the bore hole 20. A typical axial length of the enlarged bore region 20a is 0.125 inch as compared to an axial length of 0.530 inch for the entire bore hole 20.

The permanent magnet armature 22 and solenoid bobbin 18 described in the preceding paragraph and illustrated in FIG. 3 pursuant to this embodiment of the invention are advantageous to reduce the overall length of the fluid control valve 10. In particular, the shortened permanent magnet armature 22 and enlarged bobbin bore region 20a allow the overall length of the valve housing 19 to be substantially reduced; e.g. to 0.680 inch as compared to a previous valve housing length of 0.800 inch. The shorter valve housing 19 is advantageous in that it will occupy a smaller region in a transmission casing in which it is installed to modulate main line pressure to several spool valves of an electronic transmission control system.

A plurality of longitudinally extending armature guide ribs 18a are formed (e.g. molded) on the bobbin inner wall so as to extend radially inward and longitudinally or axially to guide axial movement of the armature in the bore hole 20. The guide ribs 18a are molded in circumferentially spaced relation on the inner wall of the bobbin 18 and typically are spaced equidistantly apart in the circumferential direction. There is a small clearance between the armature outer diameter and the coil bore hole, providing a small clearance between the rib inner diameter and armature outer diameter. The guide ribs 18a extend axially along a portion of the length of the bore hole 20 proximate the innermost end 22b of the armature 22.

An annular steel flux washer 28 (e.g. cold rolled 1008 or 1010 carbon steel) is disposed at the front end 18b of the bobbin 18 for concentrating electromagnetic flux of the electromagnetic coil 16 at the innermost end 22b of the armature 22. The flux washer 28 resides between an end flange of the housing 19 and a radial flange 18c of the bobbin 18. As shown best in FIG. 3, the innermost end 22b of the armature 22 engages an elastomeric ball valve 38 that cooperates with a valve seat 18d molded on the bobbin 18. The ball valve 38 and valve seat 18d define a fluid diverting valve for diverting fluid to an exhaust port in a manner described herebelow.

The ball valve 38 is received and confined laterally in a flat-sided recess or cage 18e molded in the bobbin 18 between the innermost end 22b of the armature 22 and the valve seat 18d molded on the bobbin 18. In this valve arrangement, the ball valve 38 is biased against the armature end 22b and follows movement of the armature 22 in a direction toward or away from the valve seat 18d by virtue of the fluid pressure on the ball valve and by virtue being captured in the cage 18e. The ball valve 38 is made of a high durometer elastomer having a durometer value of 80 or higher. Use of the high durometer elastomeric ball valve 38 and molded bobbin valve seat 18d is advantageous for eliminating resonance in the regulation of fluid pressure due to low line fluid pressure at high temperature, a condition that can occur during hot operation of an electronic transmission wherein the fluid is thinned and that can result in non-linear fluid control characteristics.

The coil compression spring 42 (spring biasing means) is trapped between the axial armature end 22a and a central hub 46a of the valve housing cap or closure 46. The central hub 46a includes an inwardly, axially extending cylindrical spring locating projection or stud 46g that receives the coil spring 42 with the end of the spring 42 engaging the inner surface or wall of the central hub 46a as shown best in FIGS. 3 and 4B. The permanent magnet armature 22 is biased to a valve bleed or closed position by the coil spring 42 when the solenoid coil 16 is deenergized.

In accordance with another embodiment of the invention, the valve housing cap or closure 46 itself is deformable in a manner to adjust the force exerted by the coil spring 42 on the armature 22 and thus the valve fluid pressure response to electrical current level supplied to the solenoid 14 (i.e. fluid pressure versus solenoid current). In particular, the force exerted by the coil spring 42 on the armature 22 is adjusted to provide a desired bleed rate of fluid past ball valve 38 or cracking pressure of the ball valve 38 in a manner described herebelow to provide a desired fluid pressure versus solenoid current response. The valve housing closure 46 includes a peripheral region 46b engaged to an end region of the valve housing 19 such that the central hub 46a engages the spring 42. The peripheral region 46b typically comprises a cylindrical, axially extending lip 46c received in a cylindrical end chamber 21 of the valve housing 19 as best shown in FIG. 3. The closure 46 comprises machined 6061 T6 aluminum alloy.

The valve housing closure 46 is deformable in a region defined by an annular recessed or grooved region 46d that encircles a central flat closure hub 46a. The recessed or grooved region 46d is disposed concentrically about the central hub 46a between the hub 46a and the peripheral lip 46c. The annular recessed or grooved region 46d has a relatively smaller cross-section, FIG. 3, as compared to the peripheral region 46b. The central hub 46a typically suffers the primary or majority of permanent deformation by engagement with tool T to permit axial adjusting movement of the hub 46a relative to the peripheral region 46b, although the grooved region 46d also may undergo some deformation to this same end. The grooved region 46d helps to confine the majority of deformation to the central hub 46a. The central hub 46a is permanently adjusted in axial position after the closure 46 is secured to the valve housing 19 to adjust the valve response.

The valve housing 19 includes an inwardly extending, annular end shoulder 23 proximate the end chamber 21. The end shoulder 23 overlies and engages the external surface or side of the valve housing closure 46 as shown in FIG. 3 to retain the valve housing closure securely in the valve housing.

In assembly of the fluid control valve 10 described hereabove in accordance with an embodiment of the present invention, the permanent magnet armature 22 is positioned in the valve housing 19 followed by positioning of the spring 42 in the valve housing 19 for biasing the armature in the direction to establish valve response. Then, the valve housing closure 46 is inserted in the end chamber 21 of housing 19 and the shoulder 23 is crimped or folded over onto the outer side of the valve housing closure 46 to secure it in the housing 19. Thereafter, the assembled fluid control valve 10 is adjusted at a calibration and test adjustment station ST, FIGS. 4A and 4B. The valve housing 19 is held in a hydraulic press HP by a movable fixture or clamp plate P received in the groove 63 in a manner simulating fixturing of the assembled valve 10 in the intended valve service application; for example, clamping of the valve housing 19 in a transmission housing with the valve housing supported against end thrust. An adjustment tool T is brought into axial engagement with the central hub 46a of the valve housing closure 46 to selectively axially position the central hub 46a inwardly relative to the peripheral region 46b to adjust position of the central hub 46a relative to the end of the spring 42 to adjust the valve response to solenoid current. FIGS. 4A and 4B illustrate the tool T axially engaged with the central hub 46a to this end with the hub 46a deformed to adjust its position relative to the spring 42. The tool T is disposed on a support plate SP mounted to and movable with ball nut N. The support plate SP includes bushings B guided for movement on respective guide shafts GS of the press. The ball screw S is driven to rotate by electric screw drive servomotor M.

The valve calibration set point is measured by a hydraulic pressure and flow test stand connected to the nozzle ports 72, 80. The calibration and test station ST includes an upstream pressure transducer (not shown) for measuring supply pressure and a downstream pressure transducer (not shown) for measuring control pressure for valve calibration purposes. A controlled supply pressure is maintained at inlet port 72 and a predetermined set point electrical current level is supplied to the solenoid coil 16. The servomotor M advances the adjustment tool T so that the central hub 46a of the valve housing closure 46 is plastically and elastically deformed until an initial precalibration pressure is measured by the downstream (control) pressure transducer. The servomotor M then retracts the tool T from the closure hub 46a to relax any elastic deformation. The upstream (control) pressure transducer then measures the actual pressure which is compared by a computer unit against the specified pressure (specification pressure set point) and calculates additional deformation of the closure hub 46a that may be needed to achieve the specification pressure set point. The servomotor then advances the tool T to further deform the central hub 46a, retracts, and the upsteam pressure transducer again measures the pressure for comparison by the computer unit to the specification pressure set point to determine whether additional deformation is required. When the measured control pressure reaches the specified set point, the valve is cycled throughout its operating current range and the output (control) pressure measured by the upstream pressure transducer is analyzed for proper response over the entire operating range. Once the valve calibration set point is adjusted in this manner, the fluid control valve 10 is ready for service.

Valve response adjustment using the components and in the manner described hereabove is improved and simplified in that the costly threaded adjustment screw heretofore used is eliminated and in that deformation of the end closure 46 is permanent and maintains the adjusted valve response within the desired range so as to improve reliability of the valve in service. Moreover, mechanical deformation or thread locking materials heretofore used to retain a valve adjustment screw in adjusted position during valve service also can be eliminated in the practice of the present invention.

Although the deformable, adjustable valve housing end closure 46 described hereabove is illustrated in FIG. 3 with respect to use in combination with the shortened permanent magnet armature 22, the invention is not so limited. For example, the deformable, adjustable valve housing end closure 46 can be used with a longer permanent armature (not shown) or a ferromagentic (e.g. steel) armature and an axially magnetized ring magnet (not shown) described in aforementioned U.S. Pat. No. 4,988,074 and copending application Ser. No. 08/337 613, now U.S. Pat. No. 5,611, 370, the teachings of which are incorporated herein by reference.

A plastic connector body 52 shown in FIG. 2 is mounted on the bobbin 18 and exits the housing 19 at a rear end thereof. Although not shown in FIG. 3, electrical contacts 54 extend through the bobbin 18 and through apertures in the connector body 52. Such electrical contacts 54 are shown in the aforementioned U.S. Pat. No. 4,988,074. The ends of the electrical contacts 54 are connected to the wires of the electromagnetic coil 16 for receiving an electrical current signal from a variable current source (not shown).

The valve member 12 includes a housing nozzle section 19a formed (e.g. cast) integrally with the common housing 19. The nozzle section 19a includes a longitudinal passageway 66 having a cylindrical configuration for receiving the front end 18c of the bobbin 18 and an aluminum alloy spool 67 (e.g. Al alloy 6262) which is received in the passageway 66 in a close fit, sliding manner for axial reciprocable movement.

The nozzle section 19a of the common housing 19 includes a pressurized fluid supply or inlet port 72, a plurality of control ports 80, a plurality of first exhaust ports 81 associated with the control ports, and a plurality of second exhaust ports 74 associated with the ball valve 38. These ports can be cast, machined or otherwise formed in the nozzle section 19a. The control ports 80, exhaust ports 81, and exhaust ports 74 are spaced circumferentially about the nozzle section 19a. Typically, two control ports 80, four exhaust ports 81, and four exhaust ports 74 are provided on the nozzle section 19a.

The front end 18c of the bobbin 18 includes exhaust ports 74a that communicate with the respective exhaust ports 74 of the nozzle section 19a via an annular chamber formed between the cylindrical front end 18c of the bobbin and the reduced diameter portion of the nozzle section 19a.

The inlet port 72 communicates with an annular chamber 73 that, in turn, is in communication with a radial fluid passage 67a of the spool 67 as shown best in FIG. 3. Passage 67a communicates with a longitudinal central passage 67b of the spool 67. A flow plug 69 made of brass is press fit in the spool valve so as to reside in the passage 67b and includes an orifice 69a sized to provide laminar flow of fluid to the chamber 75 and orifice 18f of the bobbin 18.

The chamber 75 is defined between the inner end 18c of the bobbin 18 and the facing rear end 67c of the spool 67. The chamber 75 communicates to an orifice 18f of the bobbin 18 that, in turn, communicates to the valve seat 18d molded on the bobbin. An O-ring seal 82 is disposed about the front end 18b of the bobbin 18 between the housing 19 and the bobbin front end 18b to prevent fluid by-pass around the ball valve 38.

Annular notch or channel 63 is formed on the exterior of the housing 19 at the nozzle section 19a to receive a fastener clip or plate (not shown) for securing the nozzle section 19a to the cast aluminum transmission body (not shown) or other fluid control system.

The slidable spool valve 67 is disposed in the nozzle section 19a to provide a two stage operation wherein, in the first stage, pressurized fluid is supplied to the inlet or supply port 72 with the forward end of the bobbin 18 and rear end 67c of the spool valve abutted and with the ball valve 38 seated against the valve seat 18d, as shown in FIG. 3, with no electrical current to the coil 16. As a result, the entering fluid flow is caused to bypass the control ports 80 and instead is directed to flow through spool passages 67a, 67b to the chamber 75 (rear end 67c of the spool valve 67). The ball valve 38 initially is seated on the valve seat 18d by virtue of the force of the coil spring 42. The position of the spool valve 67 corresponds to a minimum fluid flow spool valve position relative to the control ports 80 wherein the annular spool control land 67e is not communicated to the inlet port 72. However, once the fluid reaches chamber 75, fluid pressure increases to a level that moves the spool valve 67 to the left in FIG. 3 sufficiently to communicate the annular control land 67e to the inlet port 72. This position of the spool valve 67 corresponds to a maximum fluid flow spool valve position relative to the control ports 80 wherein the annular spool control chamber 67e is communicated to the inlet port 72. Communication of the spool control land 67e with the inlet port 72 also communicates the front end 67d of the spool valve 67 to the inlet port 72 via the passage 67g. Thus, when the steady state flow conditions are realized, the opposite ends 67c, 67d of the spool valve 67 are subjected to equal fluid pressure.

Thereafter, a second stage of operation involves controlling the fluid flow through the control ports 80 by spool valve movement between the aforementioned minimum and maximum flow spool positions. Movement of the spool valve is controlled by diverting fluid from the chamber 75 out of the exhaust ports 74 to vary fluid pressure in chamber 75 in a linear proportional manner. For example, electrical current is supplied to the coil 16 via the contacts 54 to create an electromagnetic field which, in addition to the force of fluid pressure in chamber 75, overcomes the coil spring 42 and slight force of spring plate 24 to move the armature 22 in a linear proportional manner to the current level applied to coil 16. Since the ball valve 38 moves with the armature 22, the ball valve 38 will open in linear proportional manner to the current applied to the coil 16 and divert fluid out of the exhaust ports 74 to unbalance fluid pressure on the spool valve member ends 67c, 67d to control the spool valve position in linear proportional manner between the aforementioned minimum and maximum fluid flow spool positions relative to the control ports 80 and exhaust ports 81 of the nozzle section 19a. This provides a controlled fluid flow out of the control ports 80 in direct proportion to the opening of the ball valve 38 in accordance with linear movement of the armature 22 which, in turn, is directly proportional to the amount of electrical current supplied to the coil 16 of the solenoid 14.

Such axial spool movement as described hereabove provides a negative gain mode of fluid flow control wherein there is a linear decrease in fluid pressure at the control ports 80 in proportion to an increase in electrical current to the coil 16. However, a positive gain mode of fluid flow control also can be achieved by the proportional variable force fluid control valve 10 described by reversing the flow of electrical current in the coil 16 and by introducing supply pressure through the inlet port 72 with the ball valve 38 in the full open position as determined by the position of the armature 22 with current flowing in the coil 16. This establishes a minimum fluid flow spool position relative to the control ports 80 where maximum fluid flow is diverted through exhaust ports 74. A maximum fluid flow spool position is established when no current flows to the coil 16. In particular, under a no coil current flow condition, the adjusted force of the coil spring 42 will seat the ball valve 38, or only slightly crack open the ball valve 38, relative to the valve seat 18d and apply fluid at full supply pressure to the end 67c of the spool valve member 67 to move it to a maximum fluid flow spool valve position where the control land 67e is communicated to the inlet port 72. The position of the spool valve member 67 can be varied from the minimum fluid spool position to maximum fluid flow spool valve position directly proportional to the amount of current applied to the coil 16 to provide a positive gain mode of fluid flow control at the control ports 80 wherein there is a linear increase in fluid pressure to the control ports 80 in proportion to an increase in electrical current to the coil 16. In particular, increased electrical current supplied to the coil 16 will cause the armature 22 to allow movement of the ball valve 38 from the full open position toward the closed ball valve position, or cracked open ball valve position.

The proportional variable force solenoid control valve 10 can be operated in a negative gain mode wherein the inlet port 72, exhaust ports 74, and control ports 80 of the nozzle section 19a of the housing 19 are connected to the pressurized fluid system in which pressurized fluid is supplied to the inlet port 72 and flows out of the control ports 80. The ball valve 38 initially is closed or only slightly cracked opened by the force of fluid pressure as explained hereabove. The ball valve 38 is opened by the solenoid 14 as described hereabove to control the position of the spool valve member 67 relative to the control ports 80 and exhaust ports 81 to regulate the pressure of the fluid flowing out of the control ports 80. Opening of the ball valve 38 is controlled by linear displacement of the armature 22 in proportion to the amount of electrical current supplied to the solenoid 14 via the electrical contacts 54. In the normally closed ball valve position P1 as shown in solid lines of FIG. 3 with no current flowing to the coil 16, there is no electromagnetic field, and the coil spring 42 biases the armature 22 to the position P1 wherein the ball valve 38 is seated against the valve seat 18d, thereby preventing the flow of pressurized fluid through the exhaust ports 74. The force of the coil spring 42 is sufficient to overcome the force of the pressurized fluid against the ball valve 38.

With the ball valve 38 seated against the valve seat 18d or slightly cracked open, pressurized fluid entering the inlet port 72 flows through the annular chamber 73 through the passages 67a, 67b to move the spool valve to its maximum fluid flow position where the control land 67e is communicated to the inlet port 72 and the spool valve 67 is subjected to equal pressure at opposite ends. This provides maximum fluid out of control ports 80 which can be reduced in a regulated fashion by applying current to the coil 16 via the contacts 54 so as to create an electromagnetic field which, in addition to the force of pressurized fluid through orifice 18f overcomes the opposing force of the coil spring 42 and the relatively slight force of the plate spring 24, thereby moving the armature 22 toward the position P2 shown in dashed lines in FIG. 3 corresponding to a ball valve open position. This position permits maximum fluid flow out of the exhaust ports 74 and results in the spool valve member moving to its minimum fluid flow position shown in FIG. 3 abutted against the bobbin 18 where the control ports 80 are not communicated to the inlet port 72. The pressure of the fluid out of the control ports 80 thus may be varied directly proportional to the amount of current applied to the coil 16.

For example, in a typical application of the proportional variable force control valve 10 of the invention, the nozzle section 19a of the common housing 19 is inserted into an automobile transmission body or casing to modulate the main line pressure to control several spool valves disposed in an electronic transmission control system thereby controlling the smoothness of shifting between gears of the electronic transmission. In such an application, pressurized fluid is provided to the inlet port 72. In accordance with the present invention, the spring force of the coil spring 42 is adjusted via permanent deformation of the end closure 46 as described hereabove to slightly open the ball valve 38 with no current flowing to the coil 16, thereby creating a slight bleed of fluid between the valve seat 18d and the ball valve 38 and out of the exhaust ports 74 and establishing the maximum fluid flow spool valve position to provide a fluid pressure versus solenoid current valve response within a predetermined specification. The pressure of the fluid then flowing out of the control ports 80 is linearly controlled in proportion to the amount of current subsequently provided to the coil 16 via the contacts 54 in the manner described hereabove.

Referring to FIG. 5, another embodiment of the invention is illustrated as a single stage low flow pressure regulator control device. In FIG. 5, like features of the preceding figures are represented by like reference numerals primed. The embodiment of FIG. 5 differs from the spool flow amplifying embodiment of FIGS. 1–4 in having a metering orifice 71' or other means for providing a pilot fluid pressure at control port 80'. That is, the spool 67 of FIGS. 1–4 is not present. The metering orifice 71' used to establish the pilot fluid pressure is communicated to the ball valve 38' via bobbin orifice 18f'. The ball valve 38' is movable in response to movement of the armature 22' in response to electrical current supplied to the solenoid coil 16' in the manner described hereabove to exhaust or divert fluid flow through one or more exhaust ports 74'. The pilot fluid pressure at control port 80' is thereby controlled or regulated within a specified range.

Although certain preferred embodiments of the proportional variable force solenoid valve and fluid control device for an electronic transmission of the invention have been shown and described in detail, it should be understood that variations or modifications may be made without departing from the spirit or scope of the present invention.

We claim:

1. A proportional variable force solenoid valve for controlling the pressure of a fluid in a fluid control system, comprising a solenoid coil, an armature movable in response to electrical current applied to the solenoid coil and to a permanent magnetic field of permanent magnet means, spring means for biasing the armature in a direction to establish a valve fluid pressure response to solenoid coil current, and a valve housing closure having a peripheral region for engaging a valve housing, a recessed region having a relatively smaller cross-section than said peripheral region disposed inwardly thereof, and a central region engaging said spring means and having an indentation therein from permanent deformation imparted selectively to said central region in a direction opposing said spring means in a valve assembled condition to position said valve housing closure relative to said spring means in a manner that said valve exhibits adjusted valve fluid pressure response to solenoid coil current in the valve assembled condition.

2. The valve of claim 1 further including a movable spool valve for controlling pressure of pressurizing fluid in the fluid control system, said spool valve being movable in response to said solenoid coil current.

3. The valve of claim 2 wherein said spool valve is movable relative to at least one control port.

4. The valve of claim 3 further comprising a fluid diverting valve operably engaged by said armature for diverting fluid from an end of said spool valve to control its movement relative to said at least one control port.

5. The valve of claim 4 wherein said fluid diverting valve comprises a ball valve disposed between a valve seat and an innermost end of said armature.

6. The valve of claim 5 wherein said valve seat is molded on a solenoid coil bobbin.

7. The valve of claim 1 further including means for providing a pilot pressure that is controlled in response to said solenoid coil current.

8. The valve of claim 7 wherein said means for providing said pilot pressure comprises a fluid metering orifice communicated to at least one control port.

9. The valve of claim 8 further comprising a fluid diverting valve operably engaged by said armature for diverting fluid from said metering orifice to control pilot pressure relative to said at least one control port.

10. The valve of claim 9 wherein said fluid diverting valve comprises a ball valve disposed between a valve seat and an innermost end of said armature.

11. The valve of claim 10 wherein said valve seat is molded on a solenoid coil bobbin.

12. The valve of claim 1 wherein said valve housing closure comprises a peripheral region engaged to an end region of a valve housing, a central hub region engaging said spring means, and an annular grooved region disposed between said hub region and said peripheral region, said central hub region being permanently deformed to adjust its axial position relative to said spring means to adjust said valve fluid pressure response.

13. The valve of claim 12 wherein said central hub includes an inward, axially extending spring locating projection.

14. The valve of claim 13 wherein said peripheral region comprises a cylindrical, axially extending lip received in a cylindrical end chamber of said valve housing.

15. The valve of claim 12 wherein said grooved region is disposed concentric with said central hub region.

16. The valve of claim 12 wherein said valve housing includes an inwardly extending, annular end shoulder proximate said end chamber, said end shoulder engaging an external surface of said valve housing closure to retain said valve housing closure in said valve housing.

17. A proportional variable force solenoid fluid control valve for controlling the pressure of a fluid in a fluid control system, comprising a solenoid coil on a coil bobbin, a permanent magnet armature residing in a bore of said bobbin and movable in response to electrical current applied to said coil, said permanent magnet armature having a length terminating in an outermost axial end encompassed by said solenoid coil when said solenoid coil is deenergized, said axial end having a plate spring retainer member thereon received in a radially enlarged region of said bore of said bobbin, and biasing means for engaging said axial end and biasing said armature in a direction to establish a valve fluid pressure response to solenoid current.

18. The valve of claim 17 wherein said permanent magnet armature comprises a cylindrical permanent magnet having a flat outermost axial end perpendicular to a longitudinal axis of said armature.

19. The valve of claim 17 further including a plate spring for disposing said armature in a bore of a solenoid coil bobbin and a plate spring retainer disposed on said axial end of said permanent magnet armature.

20. The valve of claim 19 wherein said solenoid coil bobbin includes a longitudinal bore in which said permanent magnet armature is received for movement and a radially enlarged end flange that engages said plate spring, said longitudinal bore being encompassed by said solenoid coil and including a radially enlarged bore region proximate said end flange for receiving a plate spring retainer member in said longitudinal bore.

21. The valve of claim 17 further including a spool valve movable relative to at least one control port.

22. The valve of claim 21 further comprising a fluid diverting valve operably engaged by an innermost end of said armature for diverting fluid from an end of said spool valve to control its movement relative to said at least one control port.

23. The valve of claim 22 wherein said fluid diverting valve comprises a ball valve disposed between a valve seat and an end of said armature.

24. The valve of claim 17 further including means for providing a pilot pressure.

25. The valve of claim 24 wherein said means for providing said pilot pressure comprises a fluid metering orifice communicated to at least one control port.

26. The valve of claim 25 further comprising a fluid diverting valve operably engaged by said armature for diverting fluid from said metering orifice to control pilot pressure relative to said at least one control port.

27. The valve of claim 26 wherein said fluid diverting valve comprises a ball valve disposed between a valve seat and an innermost end of said armature.

28. The valve of claim 17 wherein said biasing means is disposed between said permanent magnet armature and a valve housing closure that is permanently deformed to position said valve housing closure relative to said biasing means in a manner to adjust valve response.

29. The valve of claim 28 wherein said valve housing closure comprises a peripheral region engaged to an end region of a valve housing, a central hub engaging said biasing means, and an annular grooved region disposed between said hub and said peripheral region, said central hub being permanently deformed by adjusting axial position of said central hub relative to said spring means to adjust said valve fluid pressure response.

30. The valve of claim 29 wherein said grooved region is disposed concentric with said central hub of said valve housing closure.

31. A method of making a proportional variable force solenoid valve, comprising positioning an armature in a housing, positioning spring means in said housing for biasing said armature in a direction to establish a valve fluid pressure response to solenoid current and to a permanent magnetic field, and assembling a peripheral region of a valve housing closure to said housing so that a central region of said valve housing closure engages said spring means and a recessed region having a relatively smaller cross-section than said peripheral region is disposed inwardly thereof, and selectively permanently deforming said central region of said valve housing closure in a direction opposing said spring means while a spring locator projection of said central region receives said spring means thereon so as to form an indentation in said central region after assembly of said housing, said armature, said spring means, and said valve housing closure to adjust valve fluid pressure response to solenoid coil current.

32. The method of claim 31 wherein said valve housing closure is connected to said housing so that a central hub region of said valve housing closure engages said spring means and is positioned to adjust said valve response.

33. The method of claim 32 wherein an annular grooved region of said valve housing closure is disposed about said central hub region and wherein a tool engages said central hub region to position said central hub region relative to said spring means to adjust valve response, said central hub region undergoing permanent deformation by said tool to retain the adjusted hub position.

34. A proportional variable force solenoid fluid control valve for controlling the pressure of a fluid in a fluid control system, comprising a solenoid coil disposed on a coil bobbin having a longitudinal bobbin bore, a cylindrical permanent magnet armature having a length terminating in a flat outermost axial end perpendicular to a longitudinal axis of said armature with said outermost axial end encompassed by said solenoid coil when said solenoid coil is deenergized, a plate spring for disposing said armature in said bobbin bore for movement therein in response to electrical current applied to said coil, a plate spring retainer disposed on said outermost axial end of said permanent magnet, said bobbin bore having a radially enlarged end flange that engages said plate spring and a radially enlarged bore region proximate said end flange for receiving said plate spring retainer in said bobbin bore, and biasing means for engaging said outermost axial end and biasing said armature in a direction to establish a valve fluid pressure response to solenoid coil current.

\* \* \* \* \*